United States Patent [19]
Zakelj et al.

[11] Patent Number: 5,865,921
[45] Date of Patent: Feb. 2, 1999

[54] TIRE NOISE TREATMENT

[75] Inventors: Paul Zakelj, Stow; John L. Turner, Akron, both of Ohio

[73] Assignee: Bridgestone/Firestone, Inc., Akron, Ohio

[21] Appl. No.: 606,982

[22] Filed: Feb. 26, 1996

[51] Int. Cl.[6] .......................... B29D 30/00; B60C 11/03; B60C 113/00
[52] U.S. Cl. .................... 156/110.1; 152/209 R
[58] Field of Search .......................... 152/209 R, 209 D; 156/110.1

[56] References Cited

U.S. PATENT DOCUMENTS

| | | | |
|---|---|---|---|
| 3,926,238 | 12/1975 | Vorih | 152/209 R |
| 3,989,780 | 11/1976 | Vorih | 264/40.1 |
| 4,327,792 | 5/1982 | Landers | 152/209 R |
| 4,416,316 | 11/1983 | Clatworthy | 152/209 R |
| 4,442,499 | 4/1984 | Sekula et al. | 152/209 R |
| 4,474,223 | 10/1984 | Landers | 152/209 R |
| 4,727,501 | 2/1988 | Parker et al. | 152/209 R |
| 4,788,651 | 11/1988 | Parker et al. | 152/209 R |
| 4,936,364 | 6/1990 | Kajiwara et al. | 152/209 R |
| 5,295,087 | 3/1994 | Yoshida et al. | 152/209 R |
| 5,309,965 | 5/1994 | Williams | 152/209 R |
| 5,746,848 | 5/1998 | Schulze et al. | 152/209 R |

FOREIGN PATENT DOCUMENTS

| | | | |
|---|---|---|---|
| 645264 | 3/1995 | European Pat. Off. | 152/209 R |
| 178005 | 7/1989 | Japan | 152/209 D |
| 123907 | 4/1992 | Japan | 152/209 D |

OTHER PUBLICATIONS

*Honeywell Saicor Signals,* "Correlation and Probability Analysis" by Dr. I. M. Langenthal, Apr. 1970.

"The Hilbert Transform and Application to Correlation Measurements" by J. R. Underbrink, ACS 516, Dec., 1992.

"Tyre Noise Simulation at Computer" by F.N Mambretti dated 1988 This paper suggests the use of mathematical algorithms to predict the noise emission from a tire and the use of a computer to reduce this noise spectrum. See specifically, p. 177 as well as pp. 175–182.

*Primary Examiner*—Steven D. Maki
*Attorney, Agent, or Firm*—Carmen Santa Maria

[57] ABSTRACT

Circumferentially separate tire pitch sequences are selectively positioned for suppressing tire noise by comparing waveform representations of the separate pitch sequences in a correlation function and using the magnitude of a Hilbert Transform to identify minima of the absolute value of the correlation function. The relative rotated position of the pitch sequences for suppressing tire noise is selected from the vicinity of one of the minima.

10 Claims, 7 Drawing Sheets

TIRE NOISE TREATMENT

BACKGROUND OF THE INVENTION

This application relates to the art of tires and, more particularly, to arrangements for suppressing tire noise. The invention is particularly applicable for use in selectively rotating mold halves relative to one another to a position that suppresses tire noise. However, it will be appreciated that the invention has broader aspects and can be used for other purposes such as positioning individual tire tread ribs or portions of ribs and for positioning segments of molds.

Various arrangements have been used for positioning tire tread sections relative to one another in a manner that suppresses noise when the tire rolls in engagement with a pavement. Many of the prior procedures cannot analyze all conceivable relative positions between the tire sections and require a significant degree of subjective judgment for determining the relative position of the tire sections. Therefore, the prior procedures are often very time consuming and sometimes inaccurate. It would be desirable to have a procedure for minimizing the degree of subjective judgment involved in relatively positioning the tire segments and that is capable of rapidly analyzing virtually all conceivable relative positions between the tire sections.

SUMMARY OF THE INVENTION

A correlation function is used to compare waveform representations of circumferentially separate tire pitch sequences. The degree of relative shift between the waveforms that yields minima of the absolute value of the correlation function corresponds to the degree of relative circumferential rotation between pitch sequences that provides optimum noise suppression.

A preferred arrangement uses a Hilbert Transform for locating minima of the absolute value of the correlation function, and the degree of relative circumferential rotation between pitch sequences that provides good noise suppression is then selected from the vicinity of one of the minima. It will be recognized that it is possible to find minima of the absolute value of the correlation function in other ways, such as by a visual inspection of solutions to the correlation function. This involves subjective judgment and is not as accurate as use of the Hilbert Transform. Although it is possible to use a different waveform representation of the pitch sequences, a preferred arrangement uses waveforms that are frequency modulated sinusoids.

It is a principal object of the invention to provide an improved method for suppressing tire noise.

It is also an object of the invention to provide an improved method of arriving at a relative rotated position between circumferentially separate tire pitch sequences that suppresses tire noise.

It is another object of the invention to provide an improved tire having an improved relative relationship between circumferentially separate tire pitch sequences for suppressing tire noise.

It is a further object of the invention to provide a tire noise treatment that is the same for all tire sizes having the same pitch sequence.

DESCRIPTION OF A PREFERRED EMBODIMENT

Figure 1:
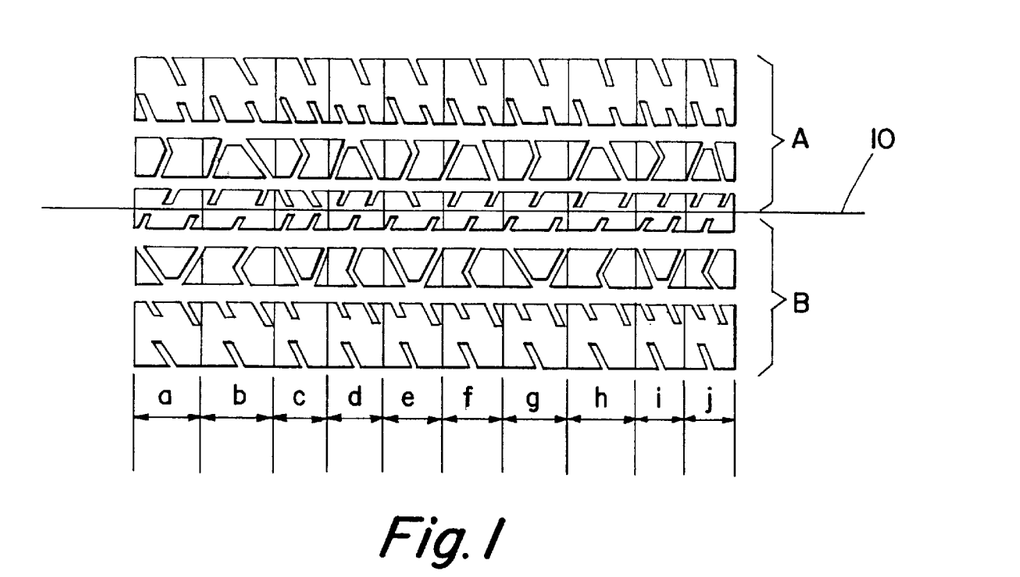
FIG. 1 is a plan view of a tire tread footprint.

Referring now to the drawing, wherein the showings are for purposes of illustrating examples and a preferred embodiment of the invention only and not for purposes of limiting same, FIG. 1 shows a tire tread plan view having circumferentially separate tire tread sections A and B on opposite sides of tire circumferential centerline 10. Tire tread sections A and B are formed in a mold having mold halves that fit together along a mold parting line corresponding to circumferential centerline 10. The mold halves are rotatable relative to one another along the mold parting line so that tire sections A and B can be circumferentially shifted relative to one another.

The tire tread of FIG. 1 has tread elements arranged in a pitch sequence generally indicated by pitches a–j. The pitches have at least two different lengths and most preferably have more than two different lengths. The frequency with which tire tread elements impact a pavement as a tire rolls at a given speed is determined by the pitch lengths and the tread pitch sequence.

The pitches are arranged around the circumference of the tire in a sequence that is designed for suppressing noise. When the same pitch sequence is used in the same position on both of tire sections A and B, that is, when the sections are aligned, any undesirable sound event produced by the particular pitch sequence is magnified because that sound event is reproduced simultaneously on both of the tire sections, thereby reinforcing the effect of the simultaneously occurring sound events. Even when the tire pitch sequence is different for each of tire sections A and B, such as where the sequence in one section is simply the reverse of the other, undesirable sound events can coincide (i.e. be in-phase) so that the undesirable sound is magnified.

Relative rotation of the mold halves makes it possible to relocate the undesirable sound events out of phase with one another so that the undesirable sounds that they produce are not magnified. Other advantages of mold rotation for suppressing tire noise are well-known to those skilled in the art.

Figure 2:
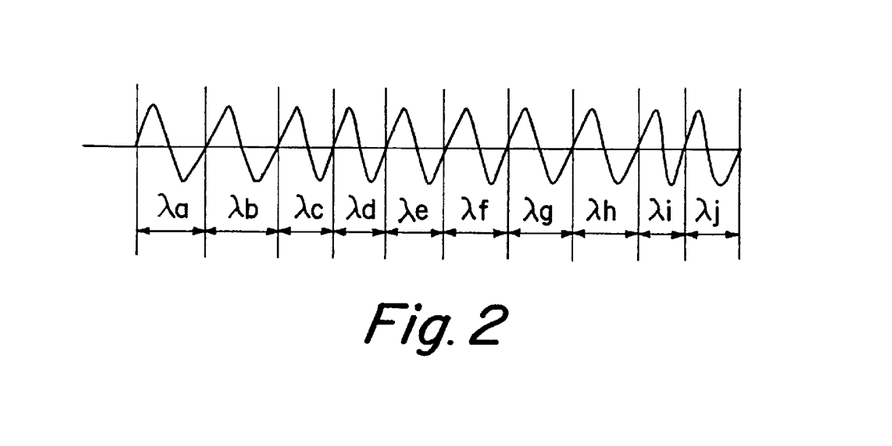
FIG. 2 shows a frequency modulated sinusoid waveform representation of a tire pitch sequence.
Figure 3:
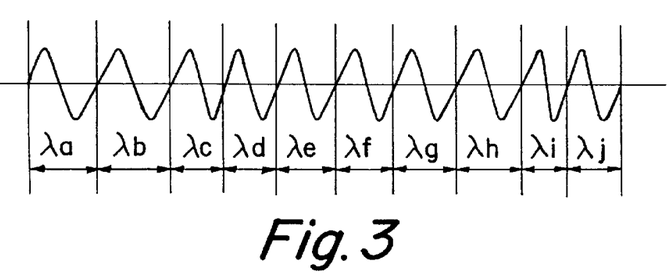
FIG. 3 shows a frequency modulated sinusoid waveform representation for a tire pitch sequence on half of the tire tread shown in FIG. 4.
Figure 5:
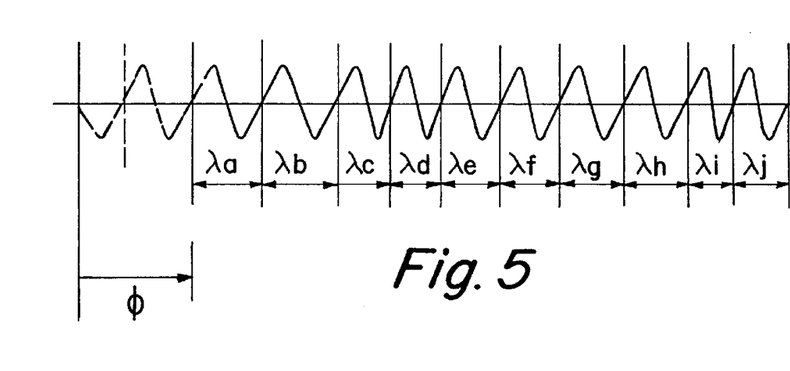
FIG. 5 shows a frequency modulated sinusoid waveform representation for one of the tire tread halves in FIG. 4.

FIG. 2 shows a simulated frequency modulated sinusoid waveform representation for the pitch sequence a–j of FIG. 1. The waveform depicted in FIG. 2 is a frequency modulated sinusoid in which each pitch a–j is represented by a wavelength λa–λj. It will be understood that the waveforms shown in FIGS. 2, 3 and 5 are simplistic simulations for purposes of explaining the theory of arranging a noise treatment in accordance with the present application. Although a frequency modulated sinusoid is the preferred waveform representation, it will be recognized that other waveforms such as rectangular, impulse and sawtooth can also be used.

Figure 4:
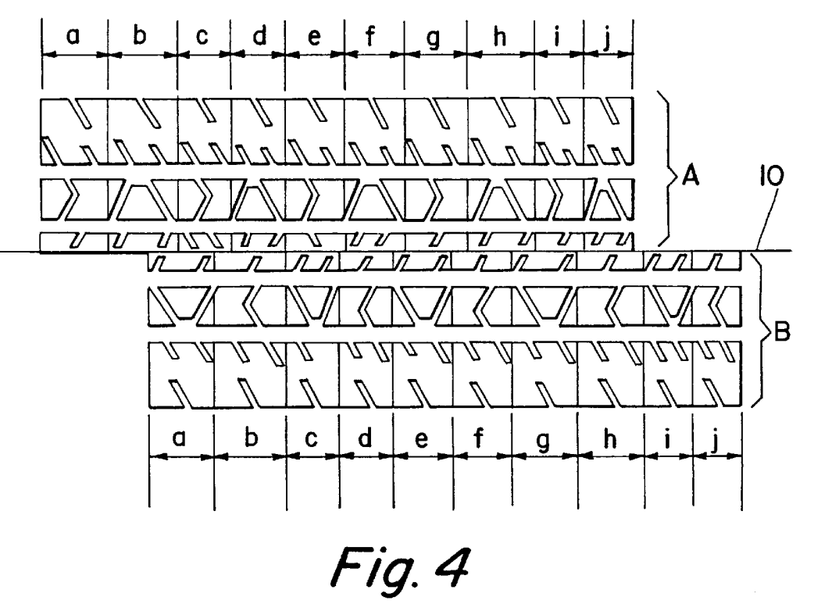
FIG. 4 is a plan view of the tire tread footprint of FIG. 1 and with one circumferential half of the tread shifted relative to the other by an angle φ.

When the mold halves are rotated relative to one another through an angle φ, tire tread sections A and B are circumferentially shifted relative to one another by the angle φ as shown in FIG. 4. The waveform representations of the pitch sequences are also shifted as shown in FIGS. 3 and 5. This makes it possible to suppress tire noise by using the shift angle between waveforms for positioning the pitch sequences relative to one another so that undesirable sound events are not reinforced.

Figure 6:
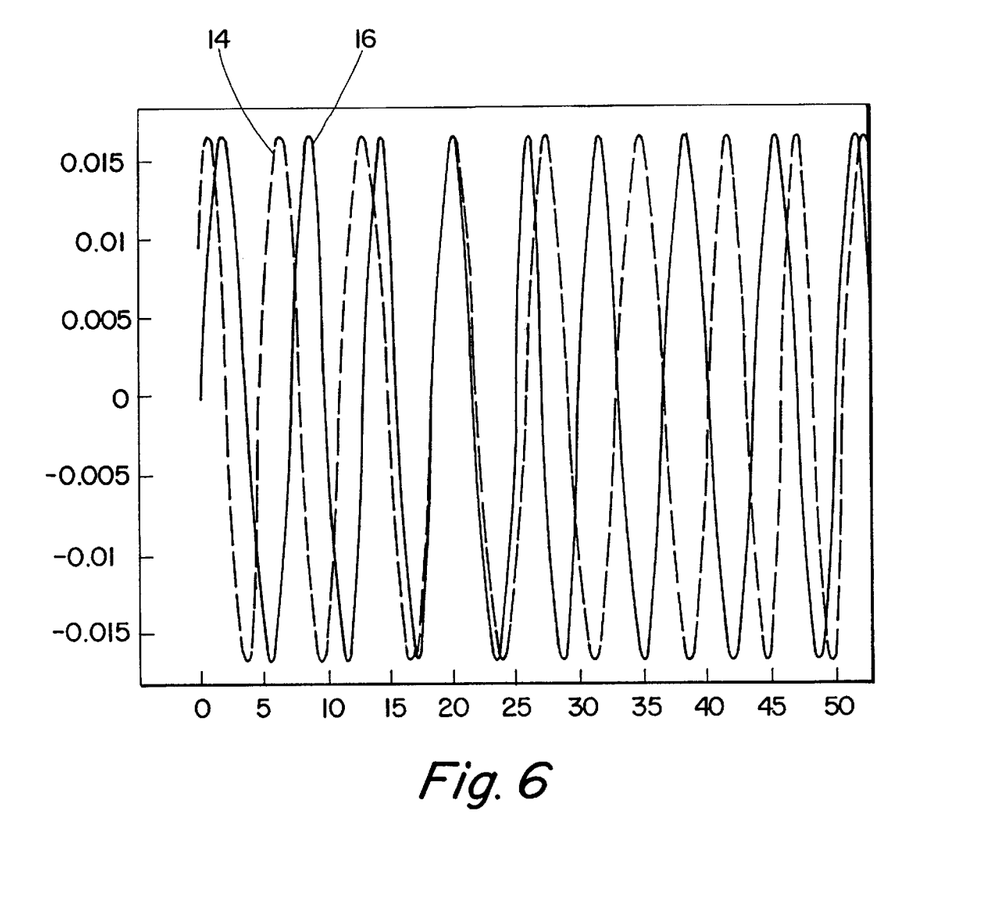
FIG. 6 shows a comparison of waveforms from two circumferentially separate tire tread sections when they are angularly shifted relative to one another.

FIG. 6 shows two waveforms 14, 16 for two pitch sequences with amplitude on the vertical axis and the degree of relative shift between the waveforms on the horizontal axis. At approximately 20°, there is an in-phase relationship that produces maximum reinforcement and at approximately 35° there is a total 180° out-of-phase relationship. The desirable shifted position for two circumferentially separate pitch sequences is usually somewhere between these extremes for suppressing tire noise.

Figure 7:
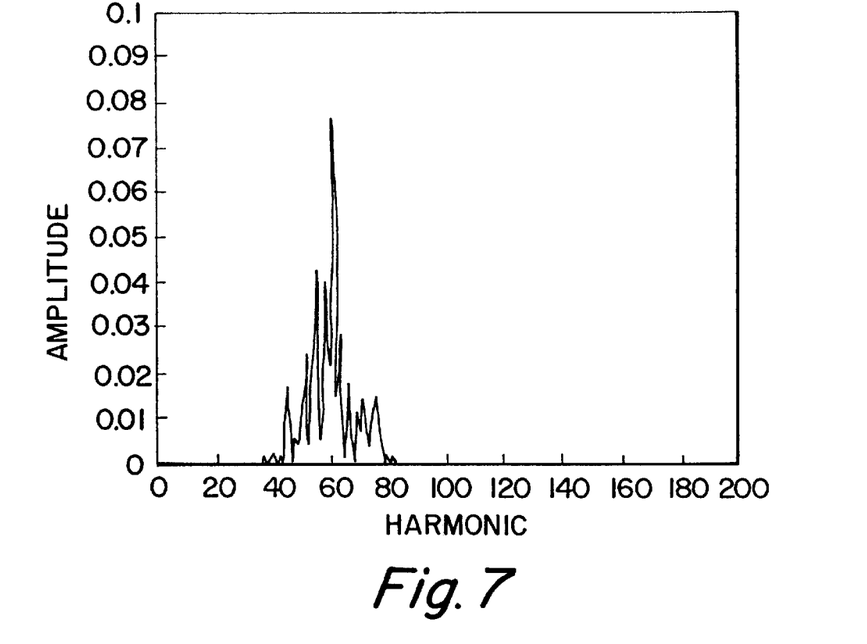
FIG. 7 shows a frequency analysis of combined modulated sinusoid waveform representations of the separate tire tread sections of a tire tread before rotation.
Figure 8:
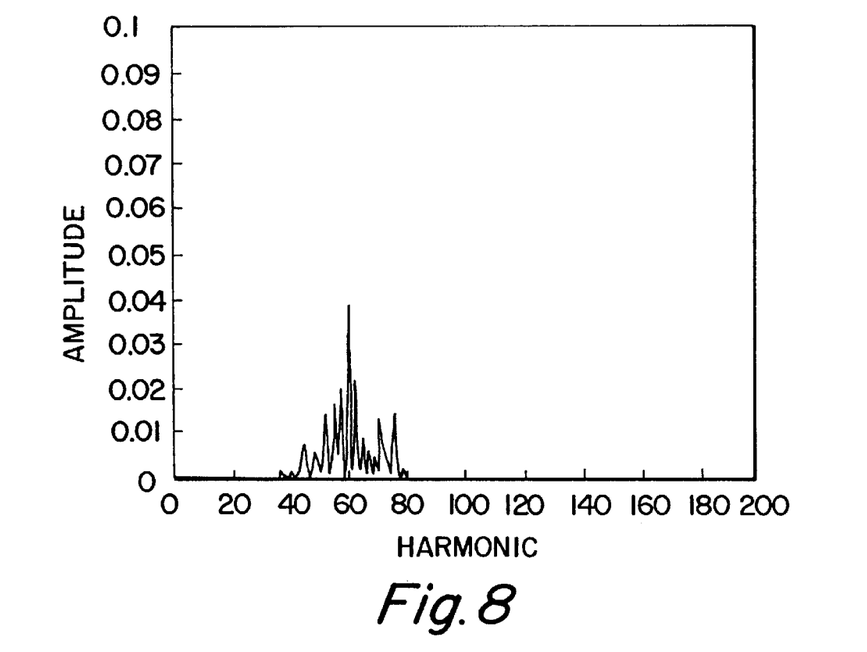
FIG. 8 shows a frequency analysis of combined modulated sinusoid waveform representation of the separate tire tread sections of the same tire tread as FIG. 7 after the waveforms have been circumferentially rotated relative to one another to a noise suppressing position, indicating the necessary angular rotation required for the tire tread sections relative to one another.

FIG. 7 is an example of a frequency analysis for a tread sequence such as the tread in FIG. 1 with amplitude on the vertical axis and the harmonic on the horizontal axis. FIG. 8 is a typical example of a frequency analysis such as for the tire tread of FIG. 5 after the tire sections have been shifted relative to one another. The maximum amplitude in FIG. 8 is approximately 0.04 whereas the maximum amplitude in FIG. 7 is approximately 0.08. Reducing the amplitude by one-half provides significant noise suppression.

Figure 9:
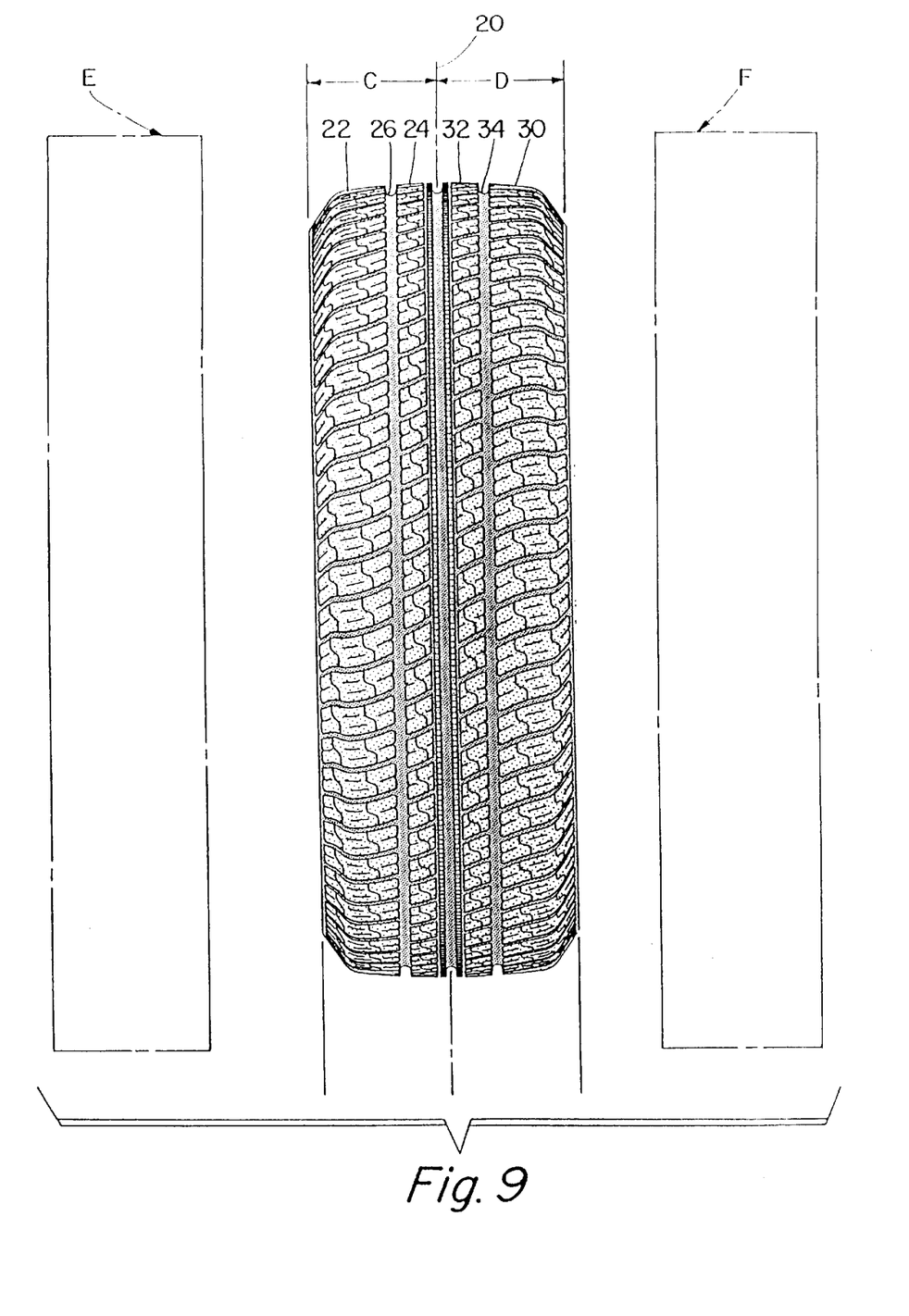
FIG. 9 is an elevational view of a tire.
Figure 10:
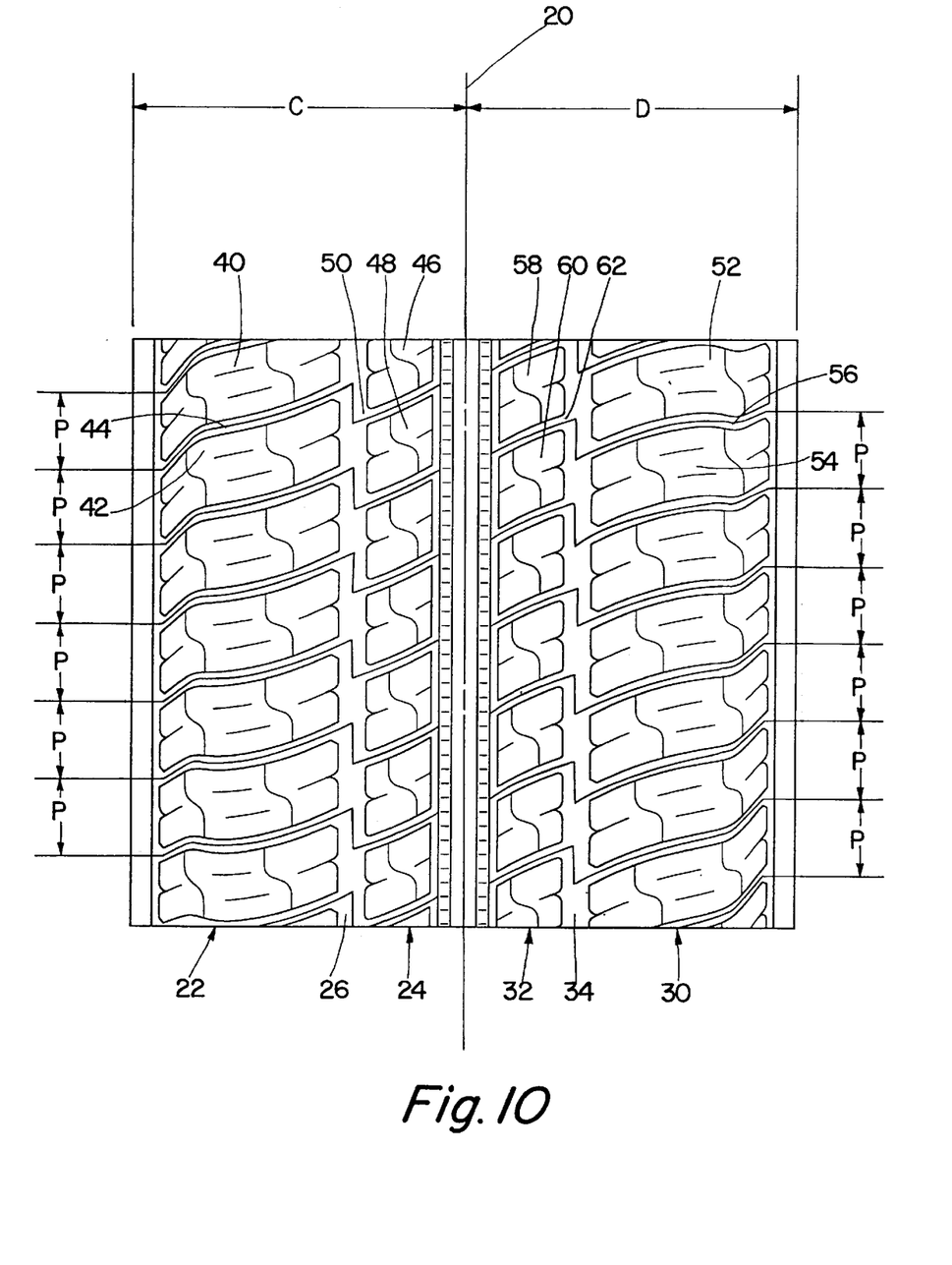
FIG. 10 is a plan view of a tire tread footprint for the tire of FIG. 9.

FIG. 9 shows a tire having circumferential tire tread sections C and D located on opposite sides of a circumferential tire centerline 20. Tire tread section C has a circumferential shoulder rib 22 and a circumferential rib 24 separated by a circumferential groove 26. Tire tread section D has a circumferential rib 30 and a rib 32 separated by a circumferential groove 34. The tire is molded in mold halves E and F that fit together along a mold parting line corresponding to tire centerline 20 and are rotatable relative to one another about their parting line. Relatively rotating the mold halves produces a tire in which circumferential tire tread sections C and D are circumferentially rotated relative to one another by the same angle of rotation that is used for rotating the mold halves.

The tire ribs are formed by a plurality of individual tread elements that are separated from one another by cross slots. The tread elements have different circumferential sizes and are arranged in a scrambled pitch sequence for suppressing tire noise. By way of example, rib tread elements 40, 42 for shoulder rib 22 are shown separated by a cross slot 44. Tread elements 46 and 48 for rib 24 are shown separated by a cross slot 50. Tread elements 52 and 54 in shoulder rib 30 are shown separated by a cross slot 56. Tread elements 58 and 60 in rib 32 are separated by cross slot 62. The tread elements are arranged in a circumferential pitch sequence with pitches generally indicated at P measured between the centerlines of adjacent cross slots. For convenience of illustration, the tread elements and pitches are depicted as having approximately the same size in the drawing. However, it will be recognized that the tread elements and pitches actually have a plurality of different sizes.

A Dayton brand tire marketed under the brand name Duralon Vertex IV has a noise treatment according to the present application with the pitches and pitch sizes indicated in Table 1 for tire size P205/75R15.

TABLE 1

| Pitch Number | Size (inches) |
|---|---|
| 1 | 0.899 |
| 2 | 1.010 |
| 3 | 1.120 |
| 4 | 1.232 |
| 5 | 1.343 |
| 6 | 1.454 |
| 7 | 1.564 |

The pitch sequence in the tire for tire section C is as follows: 2111126211513336324476623664267655212234 7734521123345415731515145126746 4. The opposite tire section D has the same sequence in reverse order as follows: 4 6 4 7 6 2 1 5 4 1 5 1 5 1 3 7 5 1 4 5 4 3 3 2 1 1 2 5437743221255676246632667442363331511262 11112. One sequence is simply the reverse of the other and it will be recognized that the sequences could be the same or that they could have other differences.

The pitch sequences and pitch sizes are first used to generate frequency modulated sinusoid waveform representations of each pitch sequence that are then compared in the following correlation function:

$$R_{xy}(\phi) = 1/2\pi \int_0^{2\pi} x(\Theta)y(\Theta + \phi)d\Theta$$

where $R_{xy}$ is the value of the function, φ is the angle over which the sequences are angularly shifted relative to one another, Θ is the angle around the circumference of the tire in radians, x is a waveform function for one of said waveforms, y is a waveform function for the other of said waveforms, and 2π is the range of Θ in radians.

Where the pitch sequences are the same for both of tire sections C and D, the waveform functions x and y will be the same. Such functions are different when the pitch sequences are different or where one is the reverse of the other.

Minima of the absolute value of the correlation function are then located using the following Hilbert Transform:

$$H[R_{xy}(\phi)] = \int_0^{2\pi} \left[ \frac{R_{xy}(\Theta)}{\pi(\phi - \Theta)} \right] d\Theta.$$

Figure 11:
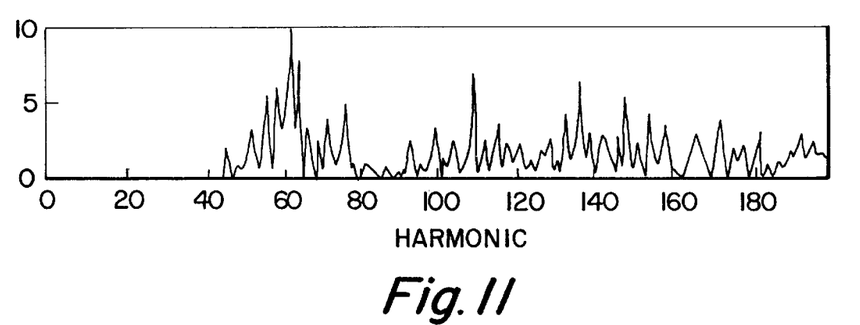
FIG. 11 is a frequency analysis of the tread sequence for the tire of FIGS. 9 and 10.
Figure 12:
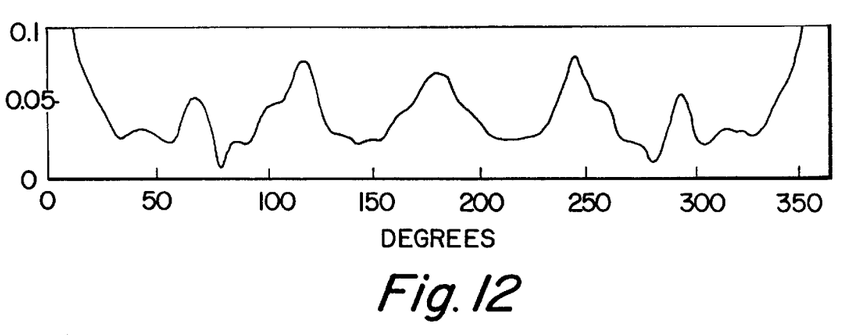
FIG. 12 shows a Hilbert Transform curve superposed over an auto-correlation curve for circumferentially separate pitch sequences for the tire of FIGS. 9 and 10.

FIG. 11 depicts a frequency analysis of the above sequence for tire section C. FIG. 12 is a curve generated using the above Hilbert Transform to locate minima of the absolute value of the correlation function. The curve in FIG.

Figure 13:
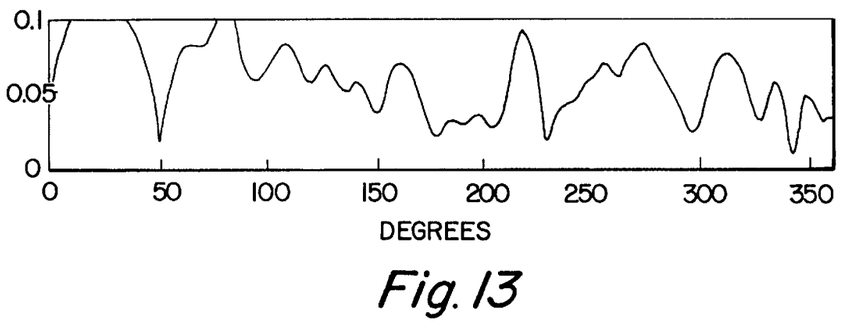
FIG. 13 shows a Hilbert Transform curve superposed over a cross-correlation curve of circumferentially separate tire pitch sequences for the tire of FIGS. 9 and 10.

12 is an auto-correlation function in which the above pitch sequence for tire section C is compared with itself as if that sequence was also used for tire section D in the same order as in tire section C. FIGS. 12 and 13 have the magnitude of the Hilbert Transform plotted on the vertical axis and the degree of relative shift between waveforms on the horizontal axis. The curve represents absolute values of the correlation function. Minima of the absolute value of the correlation function occur where the curve approaches closest to the horizontal axis.

FIG. 13 is a cross-correlation of the forward and reverse of the pitch sequence for tire section C. That is, the correlation of the above two pitch sequences for tire sections C and D following the use of the Hilbert Transform to locate the minima of the absolute values of the correlation function. The magnitude of the Hilbert Transform is on the vertical axis and the degree of relative shift between waveform representations of the pitch sequences is on the horizontal axis. FIG. 12 shows the smallest minima at about 75° and about 280°. Other minima are shown at about 150° and about 210°. The minima at about 75° and 280° are extremely narrow in the sense that relatively sharp peaks of higher noise are very close to the minima. The minima at about 150° and about 210° are broader in the sense that the noise does not increase sharply on either side of the minima. Therefore, the shift angle for the pitch sequences will normally be chosen from the vicinity of the minima at about 150° or about 210°. A slight mistake in mold positioning or small inaccuracies in the calculations are then not as likely to produce undesirable results.

A preferred procedure for selecting the minima to be used selects a curve span width within the range of about 10°–30° and more preferably a curve span of about 15°–25° and most preferably a curve span width of about 20°. Using a curve span width of about 10°–30°, it will be recognized that placing that span width on the absolute minima at about 75° and 280° will have the span width overlap areas of rather high noise. Placing the span width in the minima areas at about 150° and 210° provides a broader minima to allow for some error in mold positioning or slight error in the calculations. By way of example, a span width of about 25° would extend from about 180° to about 155°. The desired adjustment angle for the molds would then be halfway between those extremes or at about 167°. The minima in FIG. 14 would be selected in the vicinity of about 200°.

When the mold rotation angle is identified as being in the vicinity of a minima of the absolute value of the correlation function, it means that the angle is within about ±15° of the minima, more preferably within about ±10° of the minima, and most preferably within ±5° of the minima. It will be understood that the mold rotation angle depends upon the starting position for the two pitch sequences and their waveform representations. There are an infinite number of starting positions and the adjustment angle for the desired noise suppressing position will vary in accordance with the starting position. The final relative position between the two tire sections for good noise suppression will be the same regardless of the starting position between the two tire sections in performing the analysis.

FIGS. 12–13 are generated using MATLAB software available from the MathWorks, Inc., 24 Prime Park Way, Natick, Mass. 01760. Obviously, other scientific software can be used for calculating the correlation function and the Hilbert Transform. For an input noise sequence, the program calculates a 2,048 point FFT, the auto-correlation function of the sequence with itself, and the cross-correlation function of the sequence with the reverse of itself. The correlation function graphs should be interpreted as the first sequence being rotated n-degrees to the right or CCW looking at the top of the mold. An example of the program used to input data for the MATLAB follows:

Part 1. Requests input of sequence name and then reads the named sequence file.

```
length1=input(INPUT THE PITCH SEQUENCE NAME:','x');
name=length1;name=setstr(name);
name=name(1.4);
len setstr(name);len=['p' '1' len];
seq=setstr(name);seq=['p' 's' seq];
length1=eval(len);
seqn1=eval(seq),
amplitude=1;
```

Part 2. Generates the impulse function 'seq1'.

```
numb1=length(seqn1);
x1=0;seq1=zeros(numb1,2);
for k=1:numb1
if seqn1(k)==1
deltax1(k)=length1(1);
end
if seqn1(k)==2
deltax1(k)=length1(2);
end
if seqn1(k)==3
deltax1(k)=length1(3);
end
if seqn1(k)==4
deltax1(k)=length1(4);
end
if seqn1(k)==5
deltax1(k)=length1(5);
end
if seqn1(k)==6
deltax1(k)=length1(6);
end
if seqn1(k)==7
deltax1(k)=length1(7);
end
if seqn1(k)==8
deltax1(k)=length1(8);
end
if seqn1(k)==9
deltax1(k)=length1(9);
end
if seqn1(k)==10
deltax1(k)=length1(10);
end
x1=x1+deltax1(k);
timeseq1(k,1)=x1;timeseq1(k,2)=1;
end
seq1=zeros(2048,1);
deltalength1=x1/2048;
for k=1;numb1;
point1(k)=round(((timeseq1(k,1)-deltax1(1)/2)/deltalength1));
seq1(point1(k)-point1(1)+1)=(1/numb1);
end
```

Part 3. Generates the modulated sine function 'seqsine' to represent the sequence.

```
seqsine=zeros(2048,1);
find all nonzero points, i.e. pulse locations.
seqpoints=[find(seq1);2048];
determine the number of pitches.
```

```
pitches=length(seqpoints);
for k=1:(pitches-1);
t=seqpoints(k);seqpoints(k+1);
seqsine(t)=(1/numb1)*sin(2*pi*(t-seqpoints(k))/
(seqpoints(k+1)-seqpoints(k)));
end
```
Part 4. Calculates the harmonic spectrum of 'seq1'.
Part 5. Plots the harmonic spectrum.
```
    subplot(3,1,1)
    plot((2*1e5*(P(2:200,1))));
    axis([0 200 0 10]);
    grid;xlabel('HARMONIC');
    title([name])
```
Part 6. Calculates the auto-correlation of 'seqsine' and the function envelope. Plots the auto-spectrum and envelope.
```
    x1=seqsine;
    x2=seqsine;
    circdelta=[0;360/2048:360-(360/2048)]';
    x1x2=xcorr(x1,x2);
    x1x2abs=abs([0;x1x2(1:2047)]+x1x2(2048:4095));
    x1x2h-=[0;x1x2(1:2047)]+x1x2(2048:4095);
    x1x2h=hilbert(x1x2h);
    x1x2h=abs(x1x2h);
    subplot(3,1,2);
    plot(circdelta,x1x2abs,circdelta,x1x2h);
    grid;axis([0 360 0 .1]);
    title(['Auto-correlation of forward and forward of: ',name])
```
Part 7. Calculates the cross-spectrum of 'seqsine' with the reverse of 'seqsine' and the function envelope. Plots the cross-spectrum and envelope.
```
    x2r=-1*flipud(seqsine);
    x1x2r=xcorr(x1,x2r);
    x1x2rabs=abs([0;x1x2r(1:2047)]+x1x2r(2048:4095));
    x1x2rh=[0;x1x2r(1:2047)]+x1x2r(2048:4095);
    x1x2rh=hilbert(x1x2rh);
    x1x2rh=abs(x1x2rh);
    subplot(3,1,3);
    plot(circdelta,x1x2rabs,circdelta,x1x2rh);
    grid;axis([0 360 0 .1]);
    title(['Cross-correlation of forward and reverse of: ',name])
    xlabel('Degrees')
    print
```

The initial angle $\phi$ used for the analysis of the Dayton Duralon Vertex IV tire with the pitch sequences described for the tire sections C and D is defined as 0°. This angle is for a starting point with the sequences identified above side-by-side with the beginning "2" and "4" pitches for sequences C and D opposite one another.

Sequence C:  2111126211513336324476623664267655212234 77345211
Sequence D:  4647621541515137514543321125437743221255 67624663
2334541573151514512 67464
26674423633315112 6211112

After relative rotation between tire sections C and D through the angle $\phi$ of 88° the side-by-side relationship of the pitch sequences is as follows:

Sequence C:           2111126211513336324476623664267
Sequence D:  4647621541515137514543321125437743221255 67624663
6552122347734521123345415731515145126 7464
26674423633315112 6211112

An explanation of the correlation function used in this application may be found in a paper entitled "Correlation and Probability Analysis," by Dr. Ira M. Langenthal, published in SAICOR SIGNALS, a publication by Honeywell Inc's. Signal Analysis Operation, Test Instrument Division, 595 Old Willets Path, Hauppauge, N.Y. 11787, ©1970 by Honeywell. An example of the Hilbert Transform used in this application may be found in an article by J. R. Underbrink, published in 1992 as part of Graduate Level Course #516 offered by Penn State University. The disclosures of these two publications are hereby incorporated herein by reference.

Although the invention has been described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A method of determining a desirable noise suppressing position for circumferentially separate tire pitch sequences comprising the steps of:

comparing waveform representations of said pitch sequences in a correlation function to obtain comparison information, using the comparison information to select a noise suppressing position for said pitch sequences, and wherein said step of using comparison information includes determining an angle through which said circumferentially separate tire pitch sequences must be circumferentially shifted relative to one another to position same in said noise suppressing position, said correlation function comprising $$R_{xy}(\phi) = 1/2\pi \int_0^{2\pi} x(\Theta)y(\Theta + \phi)d\Theta$$

where $R_{xy}$ is the value of the function, $\phi$ is the angle over which the sequences are angularly shifted relative to one another, $\Theta$ is the angle around the circumference of the tire in radians, x is a waveform function for one of said waveforms, y is a waveform function for the other of said waveforms, and $2\pi$ is the range of $\Theta$ in radians.

2. The method of claim 1 wherein said step of using the comparison information includes the use of the magnitude of a Hilbert Transform to identify minima of the absolute value of the correlation function and said Hilbert Transform comprises $$H[R_{xy}(\phi)] = \int_0^{2\pi} \left[ \frac{R_{xy}(\Theta)}{\pi(\phi - \Theta)} \right] d\Theta.$$

3. A method of determining a noise suppressing relative angular position between at least two separate pitch sequences useable in at least two separate circumferential sections of a tire tread, comprising the steps of:

providing a waveform corresponding to each pitch sequence;

comparing said waveform using a correlation function $$R_{xy}(\phi) = 1/2\pi \int_0^{2\pi} x(\Theta)y(\Theta + \phi)d\Theta$$

where $R_{xy}$ is the value of the function, $\phi$ is the angle over which the sequences are to be angularly shifted relative to one another, $\Theta$ is the angle around the circumference of the tire in radians, x is a waveform function for one of said waveforms, y is a waveform function for the other of said waveforms, and $2\pi$ is the range of $\Theta$ in radians;

generating a curve of the absolute value of the correlation function using the magnitude of the Hilbert Transform $$H[R_{xy}(\phi)] = \int_0^{2\pi} \left[ \frac{R_{xy}(\Theta)}{\pi(\phi - \Theta)} \right] d\Theta$$

selecting a curve span width between about 10°–30°;

selecting a minimum area under the curve within said selected curve span width;

identifying the value in degrees of the angle $\phi$ at the beginning and end of said selected minimum area; and selecting an adjustment angle that is closer to the midpoint between the two values for said angle $\phi$ at the beginning and end of said selected minimum area than to the values for said angle $\phi$ at the beginning and end of said selected minimum area.

4. The method of claim 3 wherein the step of selecting a span width is carried out by selecting a span width between about 15°–25°.

5. The method of claim 3 wherein the step of selecting a span width is carried out by selecting a span width of about 20°.

6. The method of claim 3 wherein each separate circumferential section of the tire tread comprises an entire half of a tire.

7. The method of claim 3 wherein at lest one of the separate circumferential sections of the tire tread is a rib.

8. A method of angularly positioning at least two separate circumferential sections around the circumference of a tire, each section including a tread pattern having a pitch sequence, comprising the steps of providing a tire mold having mold halves in which different ones of said circumferential sections are formed and with at least one of the mold halves being rotatable to adjust the angular relationship between the separate circumferential sections;

providing a waveform corresponding to each pitch sequence;

comparing said waveforms using a correlation function $$R_{xy}(\phi) = 1/2\pi \int_0^{2\pi} x(\Theta) y(\Theta + \phi) d\Theta$$

where $R_{xy}$ is the value of the function, $\phi$ is the angle over which the sequences are angularly shifted relative to one another, $\Theta$ is the angle around the circumference of the tire in radians, x is a waveform function for one of said waveforms, y is a waveform function for the other of said waveforms, and $2\pi$ is the range of $\Theta$ in radians;

identifying minima of the absolute value of the correlation function;

selecting one of said minima;

determining an approximate angle of relative shift between said waveforms that produces said one selected minima; and relatively rotating the mold halves through a selected adjustment angle that positions the separate circumferential sections of the mold within about ±15° of said angle of relative shift.

9. The method of claim 8 wherein said step of identifying minima of the absolute value of the correlation function is carried out by using the magnitude of the Hilbert Transform $$H[R_{xy}(\phi)] = \int_0^{2\pi} \left[ \frac{R_{xy}(\Theta)}{\pi(\phi - \Theta)} \right] d\Theta.$$

10. The method of claim 8 wherein said step of providing a waveform corresponding to each pitch sequence is carried out by providing waveforms that are frequency modulated sinusoids.

* * * * *